Patented Sept. 13, 1932

1,876,629

UNITED STATES PATENT OFFICE

PAUL S. DENNING, OF JOLIET, ILLINOIS, ASSIGNOR TO FREDERIC E. SCHUNDLER, OF JOLIET, ILLINOIS

PROCESS OF COLORING GRANULAR AND OTHER MATERIAL

No Drawing.    Application filed June 21, 1929. Serial No. 372,803.

This invention relates to the method of coloring granules and other material.

One of the objects of the invention is the provision of a new and improved method of coloring granules and the like, whereby a minimum amount of coloring matter may be employed for obtaining uniformity and brilliancy of color of the finished product.

Another object of the invention is the provision of a new and improved method of coloring granules and the like whereby certain of the ingredients employed in carrying out the process may be more readily and easily mixed with the granular material.

A still further object of the invention is the provision of a new and improved process for coloring granules and the like wherein the steps of applying the coloring matter to the granules and fixing the same are performed in an efficient and economical manner.

Other and further objects and advantages of the invention will appear from the following description.

In carrying out the process, the granular or other material after being cleaned has thoroughly mixed with it in a dry state a small quantity of a slightly water soluble compound that has the property of reacting on a soluble silicate to form an insoluble compound such for instance as calcium oxide, magnesium oxide, hydrated or dehydrated calcium sulphate or calcium hydroxide.

The amount of the calcium compound, for instance, may vary within wide limits, but it has been found by experiment that about ten pounds to each ton of granular material gives excellent results. For convenience in description this compound will be termed the fixing compound.

To this mixture is added a mixture containing the coloring matter, which for convenience of description will be termed a coloring mixture. The coloring mixture may be prepared in numerous ways. The following gives satisfactory results:

Dry mix color pigment and bentonite. This is preferably done in a ball mill. Water is then added and the whole thoroughly mixed as in a conventional spiral paint mixer or the like. Since there is no chemical reaction among the element of this mixture the proportions may vary within wide limits.

The following has been found to give very good results:

The following formula is given as illustrative of the proportions of ingredients for coloring granular material. For each ton of the material to be colored red, for instance, mix the granular material with ten pounds of the fixing compound, as a calcium compound, then add the following previously prepared mixture: 10 pounds of C. P. red oxide of iron, 8 pounds of Bentonite, 60 pounds of water, 90 pounds of sodium silicate, to form the coloring mixture, then mix thoroughly and finally dry the coated granules.

The above, expressed in percentages, would be about as follows:

| | |
|---|---|
| Granules about | 91.8 plus |
| Fixing compound about | .45 plus |
| Color pigment about | .45 plus |
| Bentonite about | .36 plus |
| Water about | 2.74 plus |
| Soluble silicate about | 4.13 plus |

The Bentonite is employed solely for the purpose of holding the color pigment in suspension in the solution, whereby uniformity of color is insured. Any other finely divided or colloidal material may be employed, as china clay and the like. Of the colloidal clays, Bentonite gives the best results in that a much smaller amount is required. This is probably due to the fact that its percentage of colloidal matter is much higher than most other colloidal clays. Materials that have been peptized may also be used instead of the Bentonite.

The ingredients of the coloring mixture may be mixed in any order, but for practical work, taking everything in consideration, the order of the steps given above is preferred, at present.

After the coloring mixture is prepared it is mixed with the granular mixture and then dried at temperatures ranging from say 300° or 350° F. to around 600° F., depending on the coloring material employed. In some coloring material, as for instance hydrated ferrous oxide the temperature must be kept below 360° F., otherwise the color will be destroyed by being changed from golden yellow to pink. The maximum drying temperature will depend to a great extent on the nature of the coloring pigment employed. It must be kept below that point where the color will not be affected. It is in all cases above the boiling point of water, but in most cases it is preferably not above 600° F. The fixing material reacts on the silicate to form an insoluble silicate.

The object of the drying process is to facilitate the reaction between the soluble silicate and the fixing compound, and also to dehydrate the sodium silicate not reacted on and the calcium or other silicate formed by said reaction. When heated above the boiling point of water these silicates will lose all but about 3% of their water of crystallization, with the result that the color pigment is permanently secured to the granules without impairing the intensity or tints of the coloring matter, and the coating is rendered highly insoluble.

It will thus be seen that a process for coloring granules is provided whereby the coloring matter may be both applied and fixed to the granular material, simultaneously.

While the specific formula for coloring granules given above is at present preferred for coloring them red, it is understood that the proportions may be varied without departing from the spirit of the invention, as defined by the scope of the appended claims. For instance, the amount of color pigment given in the foregoing formula may be reduced to eight pounds to each ton of the granules and still give good results.

It has been found by experiment that by repeating the process of coloring the granules the amount of color pigment may be greatly reduced. For instance, in the above formula the color pigment may be reduced from eight or ten pounds to six pounds, thereby accomplishing a decided saving in the cost of coloring the granules since the color pigments are costly. When it is desired to repeat the process the formula given above remains the same except that three pounds of oxide of iron are substituted for the ten pounds given in the formula for each coat applied to the granules. In other words, for the two coats twice the amount of Bentonite, water, sodium silicate and the calcium compound is used, but only six pounds of oxide of iron is necessary to give each ton of granules two coats of coloring material. The intensity of the color by this double treatment, using only six pounds of the coloring matter, is substantially the same as ten pounds where only one coat is applied.

The pigment appears to be more firmly affixed, which is probably due to the fact that after the first coating there is more or less free soluble silicate on the surface of the material, and this being again coated, first with the calcium or magnesium compound and then with the coloring matter and soluble silicate, the fixing compound reacts on the soluble silicate of both coats, i. e. it acts from without on the first coat and from within on the second.

While the formula given above gives good results it is understood that the proportion of the compounds used may vary considerably and that other color pigments may be employed to secure other colors, as desired.

I claim as my invention:

1. A method of coloring granules which consists in mixing in a dry state granular material and a substance that will react on a soluble silicate to form an insoluble silicate, then applying a mixture of coloring matter and a soluble silicate solution and finally drying the mixture by artificial heat.

2. A method of coloring granules which consists in mixing in a dry state granular material and a fixing compound, then adding a solution containing a coloring pigment and a soluble silicate, and then drying the mass at a temperature above that boiling point of water but below approximately 600° F.

3. A method of coloring granules which consists in mixing in a dry state granular material and a substantially insoluble material that will convert a soluble into an insoluble silicate, and then mixing the same with a coloring mixture comprising coloring matter and a soluble silicate, and then drying the mass by heat above the boiling point of water but below approximately 600° F.

4. A method for coloring granules which consists in mixing a slightly water soluble compound that will react on a soluble silicate to form an insoluble silicate with granular material in substantially the following proportions: ten pounds of the former to two thousand pounds of the latter; then treating this mixture with a coloring composition comprising:

|  | Pounds |
|---|---|
| C. P. oxide of iron | 3 |
| Bentonite | 8 |
| Water | 60 |
| Sodium silicate | 90 | then drying the mixture at a heat above that of boiling water but below the point where the color pigment will be affected by the heat, and then repeating the process.

In testimony whereof I affix my signature.

PAUL S. DENNING.